June 22, 1926.
C. P. BROCKWAY
MOTOR DRIVE
Filed Feb. 14, 1919
1,589,459
2 Sheets-Sheet 1
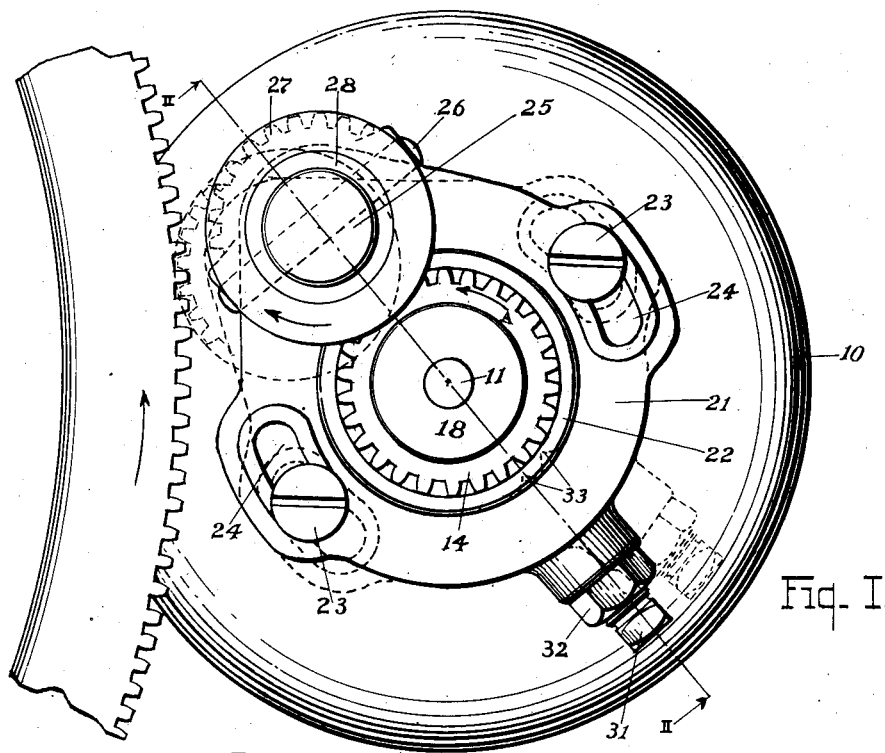
Fig. I.
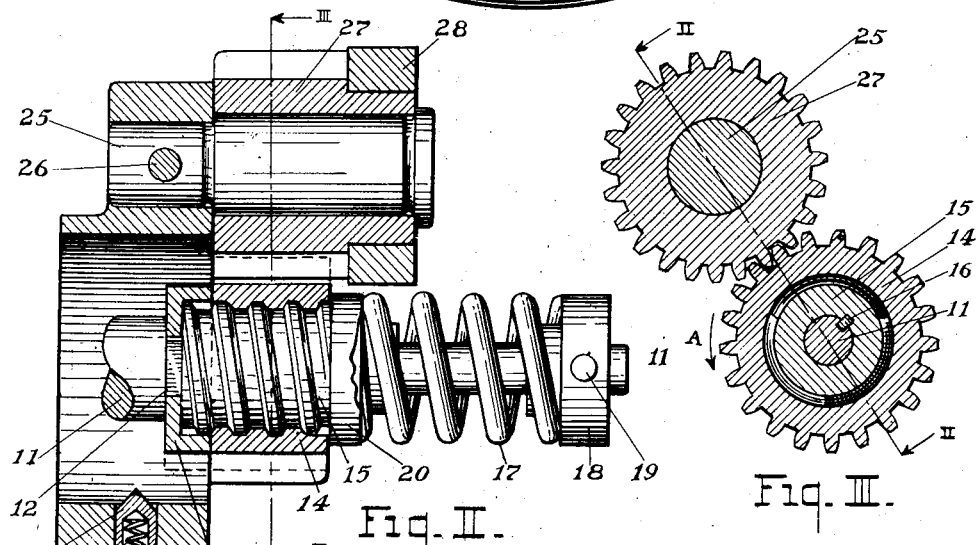
Fig. II.
Fig. III.
INVENTOR.
Carl P. Brockway
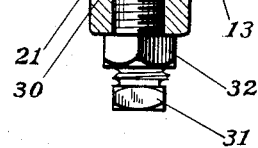
ATTORNEY June 22, 1926.
C. P. BROCKWAY
1,589,459
MOTOR DRIVE
Filed Feb. 14, 1919  2 Sheets-Sheet 2
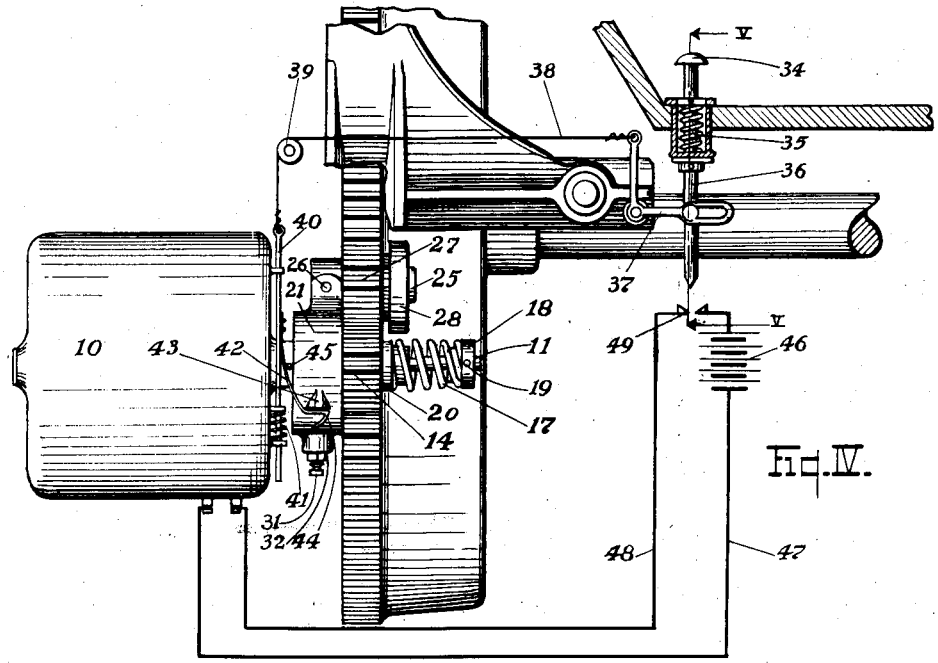
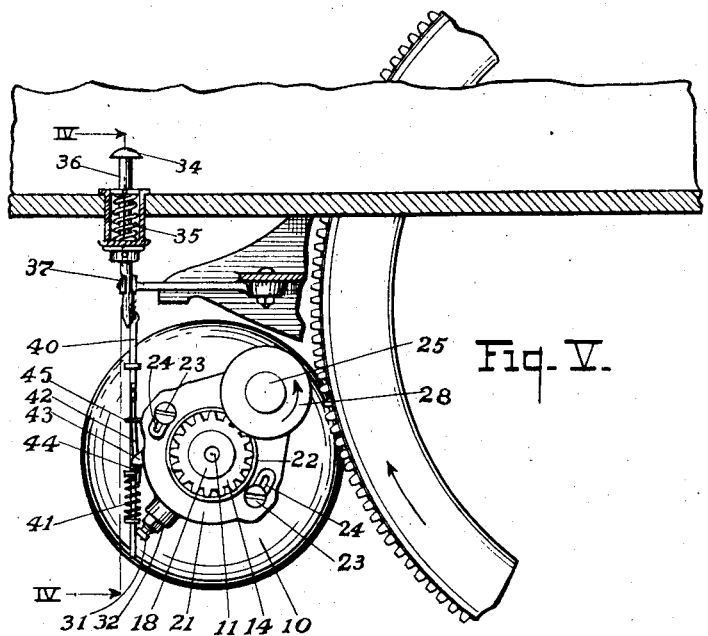
INVENTOR.
Carl P. Brockway
BY Chester W. Braselton
ATTORNEY Patented June 22, 1926.

1,589,459

UNITED STATES PATENT OFFICE.

CARL P. BROCKWAY, OF TOLEDO, OHIO, ASSIGNOR TO INDUSTRIAL RESEARCH CORPORATION, OF TOLEDO, OHIO, A CORPORATION OF DELAWARE.

MOTOR DRIVE.

Application filed February 14, 1919. Serial No. 276,951.

This invention relates to improvements in mechanism for use particularly in gas engine starters.

One object of the invention is the provision of a starter in which the rotation of a driving means shall have the effect of swinging or moving an intermediate driving means into mesh with an element of the engine, as the fly-wheel, and maintaining it there during the starting operation, and in which also, the rapid rotation of the fly-wheel or other element connected with the engine after the engine begins operating under its own power shall throw off the intermediate driving means and swing it away from the fly-wheel.

Another object of the invention is the provision of a mounting for an intermediate driving means between the driving pinion and fly-wheel, or driving means and an element connected with the engine, which mounting shall be pivoted to swing about the axis of the driving pinion or driving means to bring the gearing into and out of operative position.

A further object is the provision in connection with the gearing above referred to, of a shock absorbing means for taking up the variations in speed of the engine fly-wheel or to provide in a mechanism of the character indicated, means operative to effect a yield in the transmission of power from a motor or other source of power to the engine to be started.

Still another object is the provision of manual means for moving the starting gearing into operative position, in which the connection to the swinging supporting element or carrier is broken after the latter is in position for causing the gears to mesh, and which manual means may, if desired, be employed to close the electric circuit to the starting motor.

Other objects, and objects relating to details of construction and economies of manufacture, will appear as I proceed with the description of that embodiment of my invention which, for the purposes of the present application, I have illustrated in the accompanying drawings, in which:

Fig. I is a view in end elevation of a starting motor and a fragment of a fly-wheel, starting gearing embodying my invention being shown in inoperative position in full lines, and in operative position in dotted lines.

Fig. II is a cross sectional view taken substantially on the line II—II, Fig. I.

Fig. III is a cross sectional view taken substantially on the line III—III, Fig. II.

Fig. IV is a view, partially diagrammatic, showing my invention assembled upon an automobile.

Fig. V is a view partly in cross section on the line V—V, Fig. IV.

Similar reference characters refer to similar parts throughout the views.

In the drawings, an electric starting motor is indicated at 10 and in Figures I, II and III is illustrated one embodiment of an automatic connecting and disconnecting mechanism between a source of power such as the motor 10 and the engine to be started. The motor shaft 11 extends outwardly from the motor some distance. The outer portion of the shaft is smaller in diameter than the main part thereof, thus providing a shoulder 12, Fig. II. Against this shoulder rests a cup shaped washer 13 against which bears an annular pinion 14, interiorly threaded to fit the thread of a sleeve 15, which is longitudinally slidable upon the shaft. In Fig. III of the drawing a slot and key connection 16 is illustrated, but any means permitting longitudinal movement between the shaft and sleeve, and preventing relative rotation, is within the spirit of the invention.

A compression spring 17 surrounds the outer end of the motor shaft between a washer 18 pinned to the shaft at 19, and a washer 20 which is free to move upon the shaft. In order that the sleeve 15 may move outwardly upon the shaft, it must push against the washer 20, thereby compressing the spring 17. Inward motion of the sleeve is stopped by the washer 13. It is obvious that the spring 17 or any other yieldable means may be located or associated with the mechanism in numerous other positions to provide a means operative to effect a yield in the transmission of power from the starting motor to the engine.

As illustrating one arrangement of parts there is shown a supporting element or carrier 21, having an inner cylindrical surface, mounted to rotate upon a bearing ring 22, carried by the motor casing. The carrier 21 is guided and limited in its motion by large headed set-screws 23, the shanks of which extend through slots 24 in the carrier. A stub shaft 25 is pinned at 26 in a projection on the carrier. A pinion 27 is rotatably mounted upon the shaft 25, and meshes with the pinion 15 upon the motor shaft. Beyond the teeth of the pinion 27 it preferably carries an annular weight 28, the purpose of which will appear hereinafter. Upon the side opposite the shaft 25, an extension of the carrier 21 contains a spring pressed latch consisting of a hollow pointed latch element 29 slidable in an elongated opening and impelled inwardly by a coil spring 30, the tension of which may be adjusted by a bolt 31 threaded into the carrier 21 and secured in adjusted position by a lock nut 32. The pointed end of the latch 29 is adapted to fit in one of two recesses 33, formed in the periphery of bearing ring 22, whereby the carrier 21 may be resiliently held in either the operative or in-operative position. The mounting of the carrier 21 independently of the motor shaft 11 is an important feature in a gas engine starter mechanism, avoiding strains and increase of friction upon the motor shaft.

On Sheet 2 of the drawing I have shown my invention as applied to the engine of an automobile, with a diagrammatic illustration of a manual controlling means, which may be advantageously employed. 34 is a button adapted to be depressed by the foot of the operator against the action of a spring 35. The button 34 is mounted upon the upper end of a vertical rod 36 to which is pivoted one arm of a bell crank lever 37. The other arm of the bell crank lever is fastened to one end of a flexible connection 38, which extends around a guide pulley 39, and down to a vertically reciprocable rod 40, which is held downwardly by a spring 41. The rod 40 has riveted thereto a spring-metal finger 42 which, in its lowermost position, extends beneath a lug 43 on the side of the carrier 21. In order to guide the finger 42 to one side of the lug in passing downwardly, it is provided with a cam shaped extremity 44. As the rod 40 rises, the fixed pin 45 bears against the side of the finger 42, and gradually withdraws it from under the lug 43, so that by the time that the pinion 27 is in mesh with an element associated with the engine or the fly-wheel gear teeth, connection between its carrier 21 and the manual shifting means just described has been broken, and the carrier is free to swing in the opposite direction whenever the engine gives it the necessary impulse. If desired, the rod 36 which carries the button 34 may also be employed to complete the electric circuit from a source of current to the starting motor 10. In Fig. IV, I have shown diagrammatically a storage battery at 46 connected with the motor on one side by a wire 47 and on the other side by a wire 48, which includes a switch 49 adapted to be closed by the depression of the rod 36.

In the practical application of my invention I may or may not employ a manually operative means such as I have just described for shifting the carrier 21 to bring the gearing into operative position. When such means is used, the driver of the automobile to which the invention is attached presses upon the button 34 with his foot, thereby rocking the bell crank lever 37, pulling the flexible connection 38, and raising the rod 40 and with it the spring finger 42, which exerts a pull upon the lug 43, thus rocking the carrier 21 and bringing the pinion 27 into mesh with the fly-wheel gear teeth. As soon as this is accomplished further depression of the button 34 causes the finger 42 to release its hold on the lug 43, due to the action of the pin 45. Thereafter the operator pushes down still further upon the button 34 causing the rod 36 to bridge the contacts of the switch 49, which closes the motor circuit, 47, 48.

The use of a manual means for shifting the carrier 21 is not at all essential to the proper working of my invention, however. If said manual means be omitted the operator merely closes the circuit 47, 48 by means of any suitable switch. The motor thereupon drives the pinion 14 in the direction of arrow A in Figs. I and III. The motor shaft acquires speed very quickly, and consequently the teeth of the pinion 14, which are in mesh with the teeth of pinion 27, transmit to that pinion a sudden impulse tending to move it bodily, that is to shift the carrier 21 upon its bearings. This impulse may be partly taken up in rotation of the pinion 27 upon its shaft 25, but such rotation is delayed by the inertia of the pinion 27, due not only to its own weight but also to the weight of the ring 28 if necessary. Consequently the principal effect of the rotation of the pinion 14 at first is to shift the pinion 27 bodily into engagement with an element of a gear connected with the engine as the fly-wheel gear.

Now, whatever the means employed for bringing the pinion 27 into mesh with the fly-wheel may be, the further rotation of the pinion tends to hold it in mesh with the fly-wheel, because the rotative effort of the driving pinion 14 is divided between the rotation of the pinion 27 and a tendency to push it bodily to the left as viewed in the drawings, Figs. I and III. The spring catch 29, if used, also assists in maintaining the gearing in operative or in-operative position, but yields readily when any unusual rotative impulse is given to the carrier 21.

While the engine is being turned over by the starting motor, the rotation of the fly-wheel is irregular or jerky, because it is slowed up by the compression strokes of the pistons in the various cylinders, and receives a sudden forward impulse each time that a piston starts down again after a compression stroke. In my construction, whenever there is a retarding of the rotation of the fly-wheel, the added resistance to rotation transmitted to pinion 14 from the fly-wheel being greater than the resistance of the spring 17 against compression, causes the sleeve 15 to move outward, compressing the spring 17 and storing up energy therein. When that particular compression stroke is completed, the energy thus stored up in the spring is expended, moving the sleeve forward again thereby adding slightly for a brief instant to the speed of the rotation of the pinion 14 over that which is produced by the rotation of the motor shaft. In this way the jerks of the rotation of the fly-wheel are absorbed by the spring 17, and the load upon the motor is rendered fairly constant. By inserting means operative to effect a yield in the transmission of power from the source or motor 10 to the engine to be started, other advantages are obtained. Thus, a severe rack or strain present where a rigid connection is established, is avoided. Moreover, after compression in a cylinder of the engine as just described, and before the engine has fully started under its own power, the engine momentarily runs comparatively free, having a tendency to prematurely automatically disconnect the driving relation as hereinafter set forth. This is overcome by an increase in speed of the driving means caused by the action of the energy stored in the spring 17 or other yielding connection whereby vibration will be cushioned and the connection will be uniformly maintained. In addition, if toothed gears are used and meshed and unmeshed, the yield will insure a proper meshing and noise is effectively eliminated.

When the engine begins firing the rotation of the fly-wheel is greatly and suddenly accelerated, and a corresponding acceleration is transmitted to the pinion 27 so that its speed of rotation is considerably greater than that of the motor driven pinion 14. Consequently the teeth of the pinion 27 roll backwardly upon the teeth of the pinion 14, and shift the carrier 21 to the right, as viewed in Fig. I of the drawing. It is, of course, apparent that if a friction drive be used, the acceleration of the engine will likewise automatically throw the driving member out of engagement with the fly wheel or other element connected to the engine. It will be appreciated that the tendency which causes the carrier to swing to the left at starting is lacking now because there is no inertia in the pinion 27, and it will not be driven bodily to the left unless the friction of its bearings be greater than that between the carrier 21 and its bearings, which condition is obviously not a natural one. Of course, if the spring latch 29 be employed it will constitute a positive means for holding the parts in an inoperative position.

Now, the engine being started, the operator opens the switch 49, and if a carrier shifting mechanism is connected with the switch as in Fig. IV, the further rising of the rod 36 permits the spring 41 to draw down the rod 40 and the cam surface 44 of the spring finger 42 slides past the lug 43 on the carrier, into the position illustrated in Fig. IV, thereby setting the mechanism for the next starting operation.

I am aware that the particular embodiment of my invention above described, and illustrated in the accompanying drawings, is susceptible of considerable variation without departing from the spirit thereof, and therefore I desire to claim my invention broadly as well as specifically as indicated by the appended claims.

I claim as my invention:

1. In combination with an engine fly-wheel provided with gear teeth along its rim, a motor driven shaft, a pinion mounted thereon, a carrier mounted to rock about said shaft as an axis, means for limiting movement of the carrier, a second pinion rotatable upon said carrier and meshing with said first named pinion, the line of centers of the motor shaft and second pinion lying to that side of the line of centers of the fly-wheel and motor shaft towards which the adjacent part of the fly-wheel rim is moving, and a resiliently actuated catch arranged to releasably hold the said carrier in either extreme of its movement, the catch having inoperative contact with the carrier intermediate the extreme limits of movement.

2. In combination with an engine fly-wheel provided with gear teeth along its rim, a motor driven shaft, a carrier mounted to rock about said shaft as an axis, a pair of continuously meshing pinions, one mounted on said shaft and one on said carrier, the latter pinion being adapted to mesh with the fly-wheel gear teeth, a resilient driving connection interposed between said shaft and the pinion carried thereby, said connection comprising a sleeve rotatable with but slidable upon said shaft and having a threaded connection with the pinion upon the shaft, and a compression spring for opposing the movement of said sleeve upon the shaft.

3. In combination with an engine fly-wheel provided with gear teeth along its rim, a motor driven shaft, a carrier mounted to rock about said shaft, a pinion rotatable upon said carrier and adapted to mesh with said fly-wheel gear teeth, an internally threaded pinion mounted on the motor shaft and having continuous meshing engagement with said first named pinion, an externally threaded sleeve with which said internally threaded pinion has continuous engagement, said sleeve being secured to the motor shaft for axial movement only relative thereto, and resilient means on the shaft adjacent the sleeve operative to oppose axial movement of the sleeve on the shaft.

4. In combination, a motor driven shaft, a pinion mounted thereon, a support for said shaft including a cylindrical element arranged concentric with the shaft, a carrier comprising a collar mounted to revolve upon said cylindrical element, said carrier having a slot therethrough, a pin fixed in said support and extending through said slot to limit the motion of the carrier in one direction, a head on said pin to limit the longitudinal motion of the carrier, and a second pinion rotatably mounted upon the carrier in mesh with said first named pinion.

5. In a starting apparatus for internal combustion engines, a member operatively connected to the internal combustion engine, a source of power, a driving member operated therefrom, a second member driven from said driving member and adapted to be automatically moved into driving relation with said first mentioned member, a movable carrying means for said last recited member, and a supporting means for said movable carrying means, there being a curved slot in one of said means and a co-operative engaging element on the other of said means.

6. In a starting apparatus for internal combustion engines, a member operatively connected to the internal combustion engine, a source of power, a driving member operated therefrom, a second driving member driven from said first mentioned driving member and adapted to be automatically moved into driving relation with said first mentioned member, a movable carrying means for said last recited member, a supporting means for said movable carrying means, there being a curved slot in one of said means and a co-operative engaging element on the other of said means, and a yielding means interposed in said drive between said source of power and said engine.

7. In a starting apparatus for internal combustion engines, a member operatively connected to the internal combustion engine, a source of power, a movable driving unit driven from said driving member and adapted to be automatically moved into driving relation with said first mentioned member, and a supporting unit for said movable driving unit, there being a curved slot in a portion of one of said units, and co-operative guiding means on the other of said units.

8. In a starting apparatus for internal combustion engines, a member operatively connected to the internal combustion engine, a source of power, a driving member operated therefrom, a second driving member driven from said first mentioned driving member and adapted to be automatically moved into driving relation with said first mentioned member, and means including an arcuate slot concentric with said first named driving member for guiding and controlling movement of said second driving member into and out of engagement with said first mentioned member.

In testimony whereof, I affix my signature.

CARL P. BROCKWAY.